Nov. 19, 1940.    J. L. HIPPLE    2,221,769
TRACTOR ATTACHMENT
Filed April 17, 1937    3 Sheets-Sheet 1

Inventor
James L. Hipple.
By (signature)
Atty.

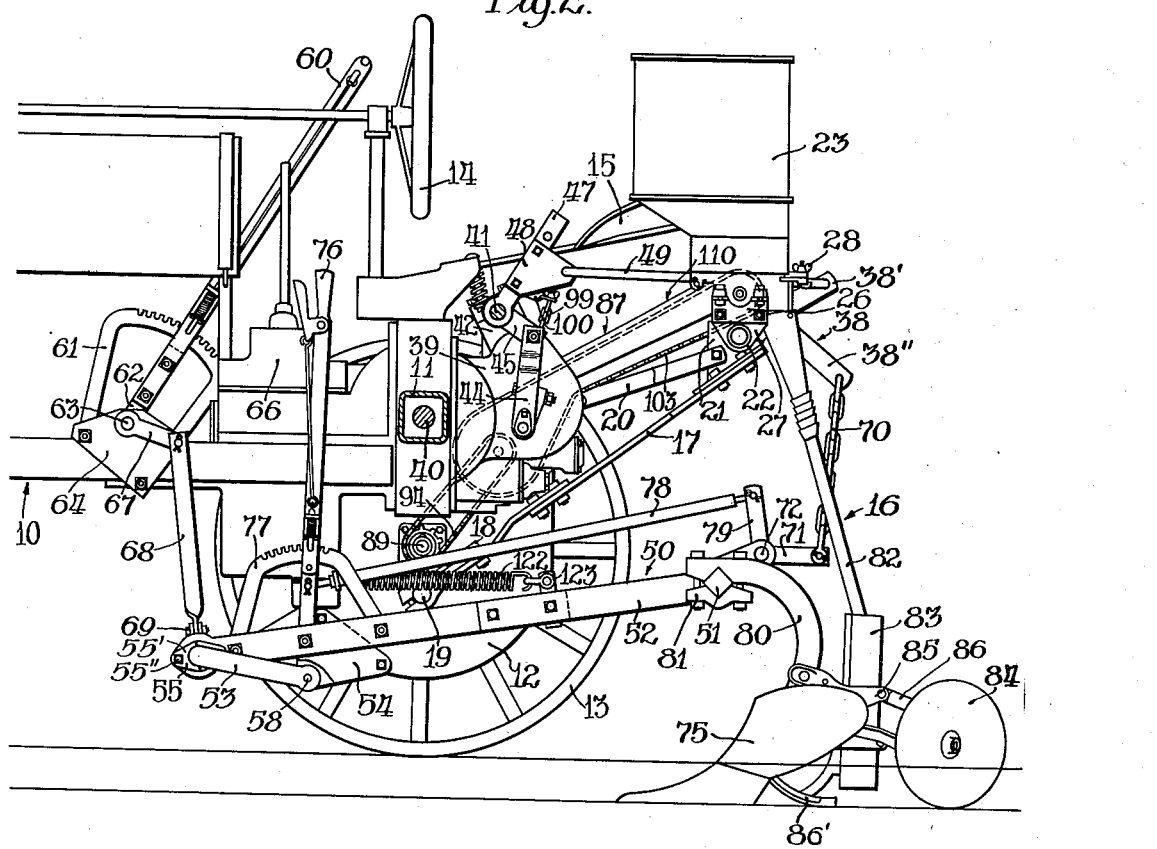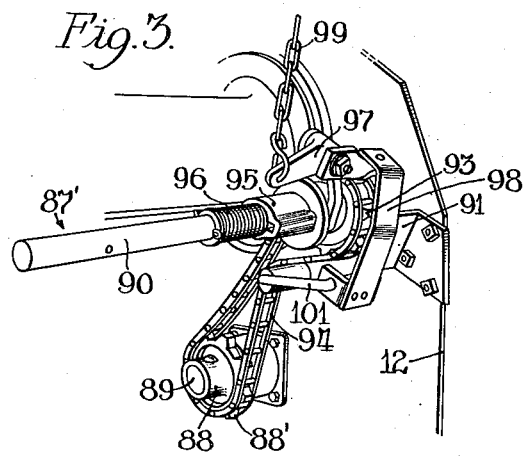

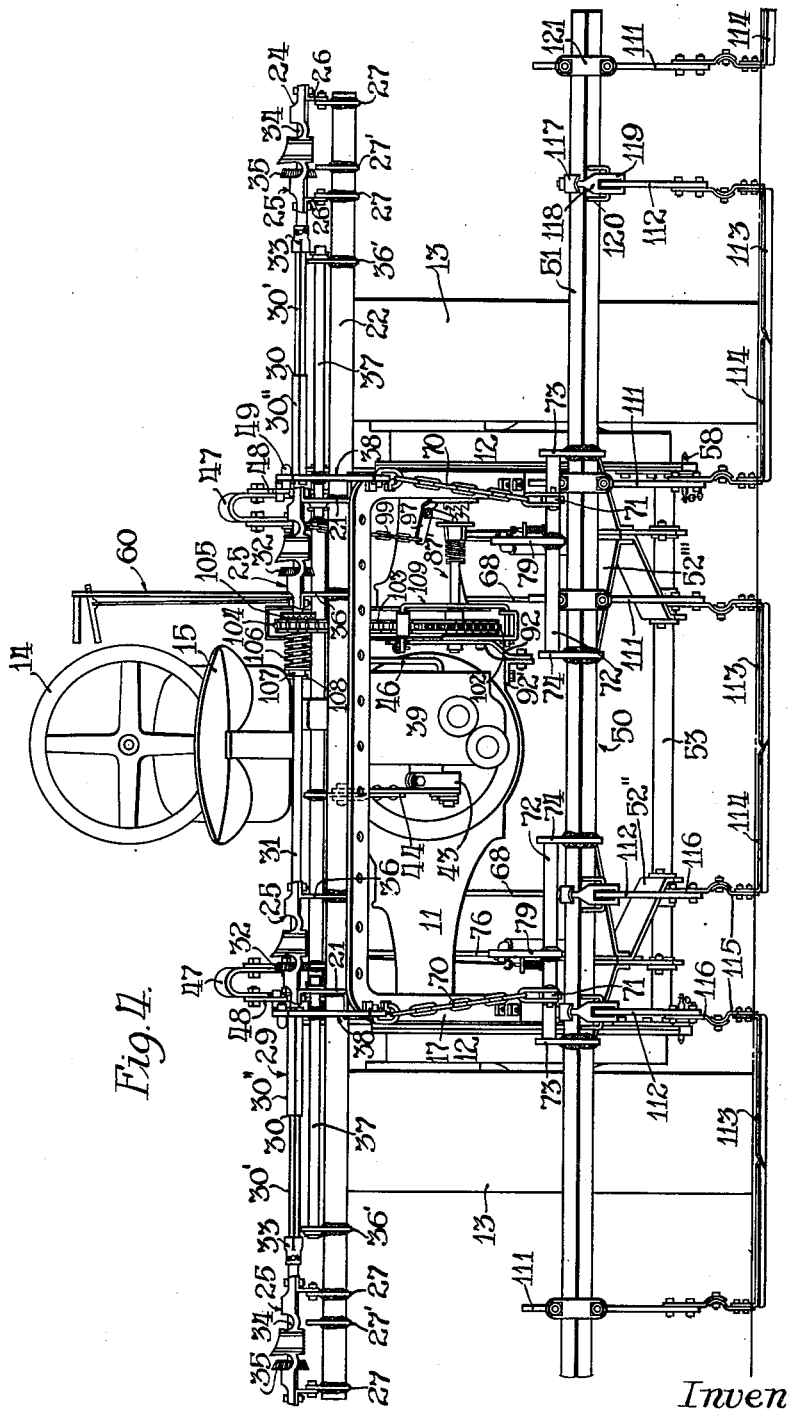

Patented Nov. 19, 1940

2,221,769

UNITED STATES PATENT OFFICE 2,221,769

TRACTOR ATTACHMENT

James L. Hipple, Canton, Ill., assignor to International Harvester Company, a corporation of New Jersey Application April 17, 1937, Serial No. 137,466

9 Claims. (Cl. 111—59)

This invention relates to farm implements and more particularly to the class of implements adapted for attachment to, and operation in conjunction with, tractors.

The principal object of the invention is to provide means for converting farm tractor implements of the general purpose type into efficient tractor planters when desired, to produce a tractor planter structure in which the planter units will be positioned to the rear of the tractor and in which a part of the planter structure may be mounted with the tractor draw-bar as a vertical support.

Another object of the invention is to provide a multiple tractor planter structure that is readily converted from a planter adapted to plant, say, two rows at a time to one for planting three or four rows, or vice versa, by adding or removing additional seed hopper devices and their associated drive means.

Another object of the invention is to provide a planter arrangement in which seed hoppers may be placed at different width row spacing locations on the hopper supporting structure, and to provide drive shafts therefor adapted to be adjusted in length to drive the hoppers at the different locations.

Another object of the invention is to provide a furrow opening supporting structure of the tool-bar type which may be raised and lowered by a power lift mechanism, and also to provide working depth adjusting mechanism in combination with the raising and lowering mechanism.

Still another object of the planter attachment is to provide means for converting the tractor planter into a cultivating attachment.

The foregoing and other minor objects have been attained by the provision of a structure having for its characteristic features of construction a transverse frame structure attached to the rear of the tractor, from which the furrow opener units are trailed. The dispensing mechanism for the planter attachment is mounted on a transversely extending frame structure to the rear of the tractor, and is supported from the draw-bar of the tractor. Means have been provided for power raising and lowering of the furrow opener units, and also means for adjusting the working depth of the furrow opener units. Mechanism has also been provided to throw the driving mechanism for the planter dispensing mechanism in and out of operation as the furrow opener units are raised and lowered from ground engaging to transport position.

The invention accordingly resides in the organization and details of construction or equivalents thereof hereinafter more particularly described, and then defined in the claims.

Referring to the drawings,—

Figure 2 is a side elevation of the planter attachments, as shown in Figure 1, with the left rear wheel removed in order to show the adjusting mechanism for the furrow opener units;

Figure 3 is a perspective view showing the clutch throw-out mechanism; and,

Figure 4 is a rear view of the planter attachment with the hoppers removed and the planter attachment converted into a cultivator attachment.

Figure 1:
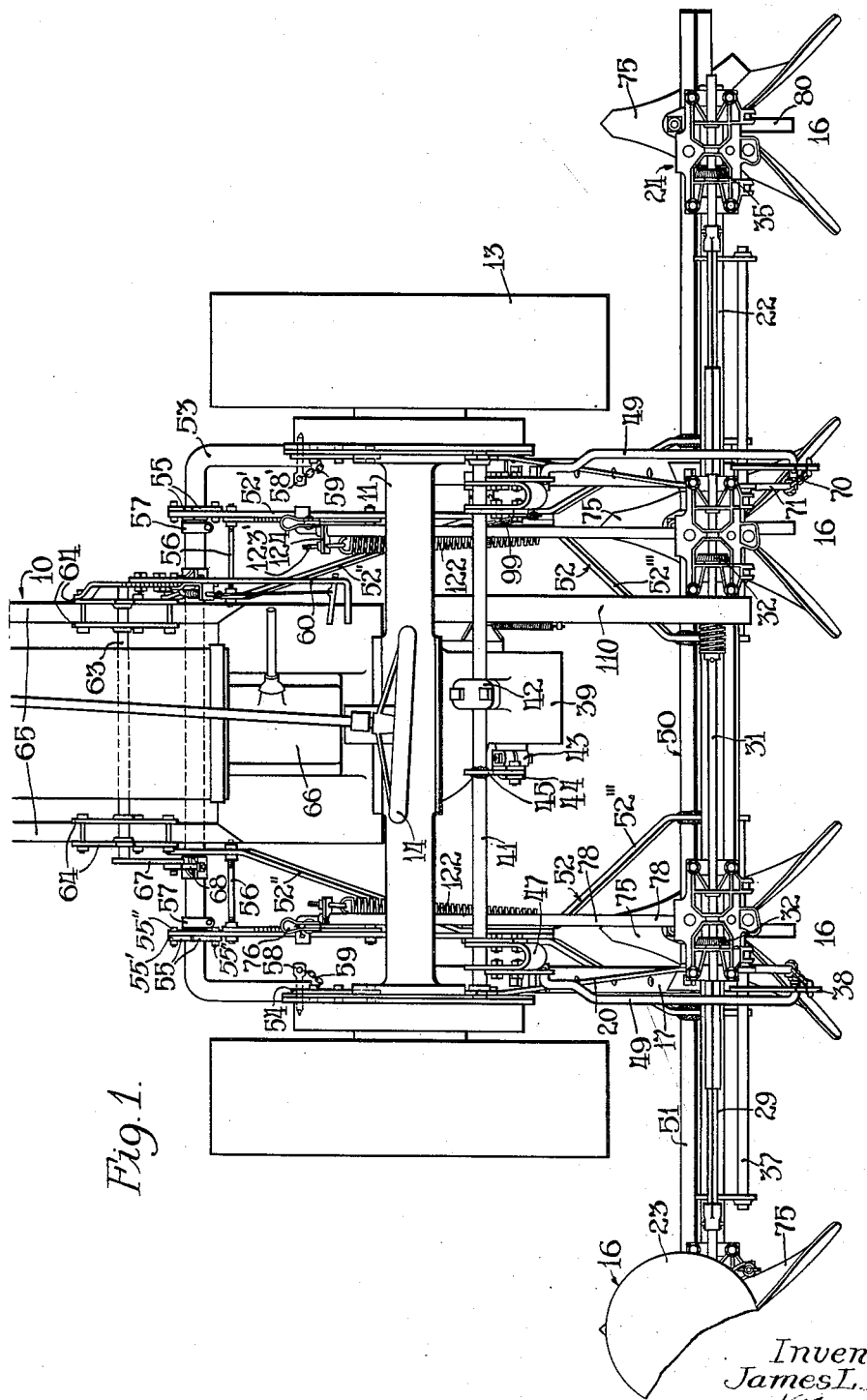
Figure 1 is a plan view showing the planter attachment attached to the rear end of a general purpose tractor of the tricycle type, with several of the hoppers detached to show the drive therefor.

In the present instance, the invention is illustrated as including a tractor of the general purpose type having a comparatively narrow longitudinal body frame 10 supported on a rear axle housing structure 11 having depending housings 12 in which are journaled axles to which are mounted wheels 13. The wheels are so positioned as to span two plant rows. The forward end of the tractor body 10 is supported on a single centrally positioned steering truck, not shown. The steering truck is steered in the usual manner by a steering wheel 14 adjacent the operator's station 15.

The planting attachment comprises a plurality of planting units 16 positioned to the rear of the tractor, as best shown in Figures 1 and 2. In this particular planter attachment there are four planting units, with two of the planting units placed intermediate the rear wheels and to the rear thereof, and two outer units placed laterally of the rear wheels and to the rear thereof. The four planting units 16 provide a four row planter attachment, and it is obvious that, if necessary, the outer units may be removed, thus converting the four row planter attachment into a two row planter attachment.

In addition, if necessary, this type of planter may be used in the method of planting known as skip-row planting. In this method, the four furrow openers are used to lay out the rows, but only three of the hoppers are used. It is obvious that with this arrangement a twenty-five per cent. reduction in acreage may be obtained and that the rows may be cultivated the same as if four rows were planted, thus keeping the fields free from weeds. As each of the planter units is similar, only one will be described, and like reference characters will denote similar parts.

As best shown in Figures 1 and 2, the tractor has pivotally mounted on the depending housings 12 a U-shaped draw-bar construction 17 which is secured at its forward end by draw-bar brackets 18 pivotally mounted on studs 19. The U-shaped draw-bar 17 is held in its raised position by forwardly extending braces 20 secured at their front ends to the depending housings 12, and at their rear ends to supporting brackets 21 mounted on the rear portion of the draw-bar 17. The draw-bar when held in its raised position by the braces 20, forms a supporting means on the tractor.

A transverse supporting member or bar 22 in the form of a pipe is welded or otherwise secured to the brackets 21. The supporting member 22 extends laterally beyond the tractor wheels 13 and is mounted on the draw-bar 17 to the rear of the wheels. The support 22 is adapted to support hopper dispensing mechanisms 23 and their driving mechanisms 24. The hopper dispensing mechanisms 23 are of a well known type and comprise the hopper and seed plates therefor. The hopper dispensing mechanisms 23 are adapted to be readily attached to and detached from their supports 25, which are mounted on the transverse support 22. The support 25 also comprises a supporting structure for the drive mechanism of each of the hopper dispensing mechanisms. The supporting member 25 is mounted by brackets 26 to supports 27 welded or otherwise secured to the member 22. An intermediate support 27' provides means for attaching hoppers at different locations when changing from one width of row spacing to another width. As each of the hopper supports 25 is similar, like reference characters will denote similar parts. Each of the hoppers 23 is attached to its support 25 by wing nuts and clamp bolts 28.

A transverse drive mechanism 29 extends along the transverse support 22. The transverse drive means 29 comprises a plurality of telescoping shafts 30 and an intermediate shaft 31. The telescoping shafts 30 comprise an inner square shaft 30' and an outer, square, tubular shaft 30". The intermediate shaft 31 is connected to the tubular shaft 30". The intermediate shaft has beveled gears 32 mounted thereon for driving the intermediate planter units 16. Connected to the outer end of the inner square shaft 30' by coupling members 33 are shafts 34, on which are mounted bevel gears 35 similar to the gears 32, for driving the seed plates of the outer hoppers 23. The shafts 34 are journaled in the support 25. The outer square tubular shafts 30" are detachably mounted at their inner ends to the intermediate shaft 31, forming a separable extension thereof. It is, therefore, obvious that with this construction the outer planter units and the telescoping drive shafts therefor may be removed, leaving only the intermediate drive shaft for driving the intermediate planting units 16, thus converting a four-row planter drive mechanism into a two-row planter mechanism.

The inner supports 25 for the planter hopper mechanism are supported at their outer ends on the brackets 21 and at their inner ends to brackets 36. Mounted on the rear of the transversely extending support 22 and connected thereto by brackets 36' are rock-shafts 37 laterally spaced on the transverse support 22. The rock-shafts 37 are journaled at their outer ends in the brackets 36', and at their inner ends are journaled in the brackets 21. The rock-shaft 37 may thus have angular or oscillatory movement in the journal brackets.

Bell cranks 38 are welded, or otherwise secured, to the rock-shafts 37 adjacent the supporting brackets 21. The bell crank levers 38 comprise an upwardly extending arm 38' and a downwardly extending arm 38" and may rock to and fro in a vertical plane. Mounted on the rear end of the rear axle 11 is a power lift mechanism 39 of the well known half-revolution clutch type for providing means for imparting a reciprocatory or oscillatory movement to the bell cranks 38. The half-revolution power lift mechanism 39 is attached over an opening to the rear of the differential mechanism for the rear axle drive shafts 40, and the power lift mechanism is connected to the motor of the tractor through the transmission of the tractor, so that the power lift mechanism may be operated while the motor is running and the tractor is standing still.

A transverse rock-shaft 41 is journaled at its outer ends in supports mounted on the depending housings 12, and has an intermediate support 42 on the power lift mechanism 39. A reciprocatory or oscillatory movement is imparted to the rock-shaft 41 by means of a crank 43 connected to the half-revolution clutch mechanism 39 and to a pitman 44 connecting a lift arm 45 welded, or otherwise secured, to the rock-shaft 41. It is, therefore, obvious that, as the power lift mechanism 39 is thrown in and out of operation by a lever 46, and as the crank 43 revolves, reciprocatory motion is imparted to the rock-shaft 41 in successive cycles. U-shaped arms 47 welded, or otherwise secured, to the rock-shaft 41 extend rearwardly and upwardly, to which are connected plate-shaped brackets 48 extending rearwardly. Lifting links 49 pivotally connected at their forward ends to the brackets 48 extend rearwardly to where they are pivotally connected to the upper extending arms 38' of the bell cranks 38. It is, therefore, apparent, as the power lift mechanism is operated to rock the shaft 41, that movement of the rock-shaft 41 is in turn transmitted to the rock-shafts 37, causing them to be rocked.

A tool bar supporting frame 50 comprising a transverse tool bar support 51 is supported from the depending housings 12. Extending forwardly from the tool bar support 51 are laterally spaced and longitudinally extending draft members 52, which are welded or otherwise secured at their rear ends to the tool bar support 51. Each draft member 52 consists of the longitudinally extending draft member 52', a forward brace 52", and a rear brace 52"'. The rear brace 52"' is laterally spaced inwardly and forms a V-shaped structure with the draft member 52', which is also bent out laterally from its center line. This construction, as the brace 52"' is welded to the tool bar support 51, acts to stiffen the tool bar supporting frame construction, so that all the torsional strains on the frame are eliminated. The rear brace 52"' extends forwardly to the mid-portion of the draft member 52 where it is secured. The forward brace 52" is secured to the draft member 52' at its mid-portion where the rear brace 52"' is secured. The brace 52" extends inwardly and forwardly, forming a lateral support to prevent torsional strains in the draft member 52. At their forward ends the draft member 52' and the brace member 52" are journaled on a forwardly extending U-shaped, tubular draft bail 53, which is pivoted on forwardly extending thrust members 54 secured to the depending housings 12. Split bearings 55 are mounted on the forward ends of the members 52', where the draft members 52 are journaled on the draft bail 53. The removable bearings 55 are used to prevent excessive wear on the draft members 52, so that a good contact is maintained between the draft members and the draft bail to prevent any loose connections to throw the frame out of line. Each half of the bearing has a radially extending lug portion 55', through which fastening bolts 55'' are disposed to hold bearings in the end of the draft member 52. The enlarged hole in the end of the draft member, which receives the bearing element, permits easy insertion or removal of the draft member from the U-shaped draft bail. A tie-brace 56 keeps the draft member 52 and the front brace 52'' in position. A collar 57 secured to the draft bail 53 maintains the draft frame in position on the draft bail.

The draft bail is removably attached to the thrust members 54 by detachable pins 58 and 58'. These pins are attached respectively to the thrust members 54 by a chain 59 to keep the pins from being lost when the planter attachment is removed from the tractor. It is obvious that, with this detachable pin construction, the draft bail 53 may be quickly detached from, or attached to, the tractor.

The draft bail 53, being pivoted on the thrust members 54, may be adjusted vertically in order to maintain the correct line of draft or proper suction for whatever depth the plow bottoms are set. The draft bail 53 is adjusted vertically by an adjusting lever 60 extending rearwardly to within reach of the operator's station 15. The adjusting lever 60, having the usual thumb latch and detent construction, is adjusted about an adjusting quadrant 61. The adjusting lever 60 is secured to an arm 62, which is secured to a transverse rock-shaft 63. The transverse rock-shaft 63 is journaled in supporting brackets 64 in the form of plates, which are clamped to side walls 65 of the tractor ahead of a transmission housing 66. Lifting arms 67 secured to each end of the rock-shaft 63 are pivotally connected to the draft bail 53 by lifting links 68. The lifting links 68 are pivotally connected at their lower ends to brackets 69 secured to the draft bail 53.

In order to raise and lower the tool bar supporting frame 50, lifting chains 70 are connected to the lower arm 38'' of the bell cranks 38. The lifting chains 70 at their lower ends are connected to lifting arms 71 having a to and fro, or angular, movement in a vertical plane. The lifting arms 71 are welded, or otherwise secured, to transverse rock-shafts 72, which are laterally spaced from each other on opposite sides of the center line of the tractor and are mounted on the tool bar support 51. The lifting arms 71 may be said to have an oscillatory, vertical movement about the axis of their respective rock-shafts. The rock-shafts 72 are journaled in upwardly and rearwardly extending extensions 73 and 74 of the draft member 52' and the rear brace 52''', respectively.

Means for adjusting the position of each of the lifting arms 71 in order to adjust the vertical depth of lister plow bottoms 75, or other ground engaging tools is provided by adjusting levers 76 mounted adjacent the longitudinally extending body portion 10 of the tractor, and just ahead of the rear axle 11 on the tractor, so that they may be adjusted from the operator's station 15. Each of the adjusting levers 76 is pivotally mounted at the forward end of the draft members 52. The levers 76 have the usual thumb latch and detent construction and are adjusted about an adjusting quadrant 77 secured to draft members 52'. The adjusting link 78 extends rearwardly from the adjusting lever 76 to where it is pivotally connected to an adjusting arm 79 welded, or otherwise secured, to the rock-shaft 72. As each of the adjusting mechanisms is similar, only one has been described, and like reference characters have been used to denote similar parts. It is apparent that, as the lever 76 is adjusted by moving the lever forwardly, the arm 71 will be raised and the plow bottom 75 will be lowered, thus increasing the depth of plowing or planting. It is also obvious that, as the lever 76 is moved rearwardly, the arm 71 will pivot on the lifting links 70, causing the lister bottoms 75 to be raised. The arm 71 may be considered as a rigid link in the chain 70, and by changing the position of the arm or link 71, the length of the entire chain is affected. It is likewise apparent that the length of the chains 70 may be increased or decreased, causing the implement frame to be raised or lowered to a given position, and that, by adjusting the lever 76, adjustment of the depth may be increased or decreased from the maximum position.

The lister bottoms 75 are secured to stub beams 80, which are adjustably secured to the tool bar support 51 by clamps 81. It is apparent that various row spacings may be obtained by adjusting the stub beams in and out at will.

In the planter attachment, as best shown in Figure 2, a flexible tube 82 connects each of the hoppers 23 with a seed boot 83, which is secured to the stub beam 80 to the rear thereof, and also to the rear of the lister plow bottom 75. It is obvious that, as a furrow is opened by the lister plow bottom 75, seed will be dispensed in the furrow and will be covered by a disk covering attachment 84, which is trailed to the rear of the seed boot 83 and connected to the stub beam 80 by a bracket 85. The covering attachment 84 may be adjusted by an adjusting link 86. A gauge shoe 86' secured to the lister bottom 75 prevents the plow bottom from gouging too deeply and acts to maintain a uniform depth of furrow.

As each of the planting units 16 is similar, only the furrow opening and covering devices of one has been described, and like reference characters denote similar parts.

In order to drive the planter dispensing mechanism, a planter drive mechanism 87, as best shown in Figures 2, 3 and 4, has been provided. A sprocket attachment 88 is attached to the right depending housing 12, and a shaft 89 on the sprocket attachment is secured to the stub axle of the right rear wheel in a well known manner.

A jack shaft 90 is journaled at its outer end, as best shown in Figure 3, in a supporting bracket 91, and at its inner end is journaled a supporting bracket 92, which is secured to a downwardly extending bracket 92' and is secured to the bottom of the rear axle housing 11. A sprocket 93, as best shown in Figure 3, is loosely mounted on the shaft 90 and is driven by a chain 94 from the sprocket 88'. A throw-out clutch 95 is slidably mounted on the shaft 90 and is held in engagement with the clutch portion on the sprocket 93 by a spring 96. A clutch throw-out arm 97 is pivotally supported by a bracket 98 secured to the bracket 91. A chain 99 is adjustably connected to an arm 100, as best shown in Figure 2, attached to the U-shaped arm 47. It is obvious that, as the lifting mechanism is operated, the arm 100 will move vertically, throwing the clutch mechanism out as the tool bar supporting frame is raised, and permitting the clutch to engage when the tool bar supporting frame is lowered. It is, therefore, obvious that the planter attachment drive mechanism will be stopped when the tool bar supporting frame is raised, and will be started when the tool bar supporting frame is lowered. A chain tightener 101 is used to tighten the chain 94.

At the inner end of the jack shaft 90 is mounted a sprocket 102 which drives, through a chain 103, the intermediate shaft 31 and the adjacent telescoping shafts 30 which are connected thereto. The chain 103 drives the shaft 31 through a sprocket 104, which is slidably mounted on the shaft 31, forming with clutch members 105 a safety clutch permitting the sprocket 104 to rotate in the event of an over-load, or of clogging of one of the dispensing mechanisms. A spring 106 normally causes the clutch portion of the sprocket 104 to engage the clutch member of the clutch 105, which is secured to the shaft 31. The tension on the spring 106 may be adjusted by the adjusting nut 107, and is held in adjusted position by a pin 108 extending through the shaft 31. A chain tightener 109, as best shown in Figure 4, takes the slack out of the chain 103. A shield 110 prevents the operator from being caught in the chain 103. It is, therefore, obvious from the above description that the driving mechanism for the hopper dispensing mechanisms is driven from the rear axle as the tractor and its attached planter move forwardly; and that the drive mechanism may be thrown in and out of operation whenever the power lift mechanism is operated to raise and lower the tool bar supporting frame. It is also obvious that the drive mechanism has means for preventing breakage of various parts in the driving mechanism by a simple over-load clutch, which automatically throws out whenever an over-load is placed upon the hopper driving mechanism.

In the rear view, as shown in Figure 4, the planter attachment in this particular instance is used as a cultivator attachment. When it is used as a cultivator attachment, the dispensing hoppers 23 are removed along with the stub beams 80 and their attached furrow opening and closing members, so that the entire planting unit 16 may be considered as removed. The drive chain 94 may be detached or the throw-out clutch 95 locked in the position shown in Figure 4, so that it may not be operated as the tool bar supporting frame is raised and lowered. In this particular instance, the stub beams 80 have been removed, and knife weeder attachments have been substituted in lieu thereof, making a four row cultivator. The standards for the knife weeder attachments are of two forms. Outer left standards 111 are vertical, while adjacent left inner standards 112 have a horizontal and downwardly extending rear portion. The right inner standards are similar to the left outer standards 111, while the outer right standards comprise one similar to the standards 111 and another similar to the standards 112. By this arrangement, it is possible to place the cultivator knife plates in staggered relation to one another, so that the trash clears each plate and the adjacent knife weeders do not overlap. In this arrangement, the standards for the outer left row and the inner right row adjacent the center line of the tractor and one of the standards for the outer right row are in alignment, while the standards for the left inner row and one of the standards for the right outer row are in alignment with the rear of the previously mentioned standards 111. Knife weeders 113 and 114, having oppositely disposed ends, are connected to supports 115 provided with an adjustment for adjusting the knife weeders angularly. The brackets 115 are connected to plate brackets 116 having a complementary adjusting portion to that of the brackets 115. Each standard 111 and 112 is clamped to the tool bar support 51 by clamp brackets 117. Clamp brackets 117 comprise a U-shaped member 118 slotted, as at 119, to receive either of the standards 111 and 112. A U-shaped clamp portion 120 is notched to conform to the square tool bar 51, and its flat surface provides a bearing surface for the standards 111 and 112.

A clamp 121 conforming to the tool bar 51 is clamped to the U-shaped member 118 in the usual manner. With this construction, it is possible to adjust the standards 111 vertically and the standards 112 horizontally. The clamp 117 also provides for transverse adjustment on the tool bar support 51. From this description it is obvious that a simple four-row cultivator of the knife weeder type has been formed, and it is also evident that other types of tools may be used to replace the knife weeder attachment for cultivating. The adjustment of the cultivator attachment for cultivating depth is adjusted by means of the levers 76. In raising and lowering the cultivator attachment, the operator trips the lever 76 of the power lift mechanism to raise or lower the attachment in the same manner as the planter attachment frame is raised and lowered. Further adjustment of the tool bar supporting frame 50 may be had by adjusting the lever 60.

It is apparent from the description that a very simple rear mounted tractor planter construction, and also four-row tractor cultivator have been described. The planter units and cultivator attachment are closely coupled to the rear of the tractor, so that the raising and lowering of the front end of the tractor do not affect the depth of planting. A very simple drive mechanism has been provided for the hopper dispensing mechanisms, and a simple means has been provided for throwing the hopper drive mechanisms in and out of operation as the tool bar supporting frame is raised or lowered. In addition, a simple means of adjustment has been provided for finely adjusting the planting depth or cultivating depth of the respective ground engaging tools of the planter attachment, and the cultivator attachment. Also, a power lift mechanism has been provided, which is operated from the motor of the tractor for raising and lowering the tool bar supporting frame. The connections for mounting the planter attachment are such that the planter attachment may be readily connected to and disconnected from the tractor by the removal of a few parts, leaving the tractor with its standard draw-bar ready to be connected to other types of tools and ready to be trailed from the draw-bar.

In the construction described and illustrated, the tool bar supporting frame is counterbalanced by counterbalancing springs 122 to aid the operator in adjusting the tool bar supporting frame vertically. The counterbalancing springs 122 are connected at their rear ends to a spring bracket 123 secured to the bar 52 intermediate the ends thereof, and at its forward end the counterbalancing spring is adjustably connected to the adjusting lever 76 by an adjusting screw 123' and bracket 124. With this counterbalancing mechanism or means, it is obvious that the effort exerted by the operator in adjusting the tool bar supporting frame 50 is reduced to a minimum.

To detach the planter from the tractor, the lifting chains 70 are disconnected with the tool bar supporting frame in its ground engaging position and the pins 58, 58' are removed, and the tractor driven away, after the links 68 have been detached from the lifting arms 67. The adjusting lever 60 may or may not be removed, but, if it is to be removed, only the lower bolt in the plate members 64 need be detached, allowing the lifting lever and its adjacent parts to be readily removable. Each of the hoppers 23 are then removed by simply detaching wing nuts and clamp bolts 28. The transversely extending supporting frame 22 with the drive mechanism mounted thereon may be readily removed by detaching the brackets 21 from the draw-bar 17 after the chain 103 has been detached. The jack shaft 90 and its corresponding parts may be readily detached, if necessary. The lifting links 49 from the power take-off rock-shaft should next be discontinued. It is obvious that the transversely extending support 22 may be readily moved after the braces 20 have been disconnected. The power lift mechanism may or may not be disconnected, depending upon whether it is to be connected to other tools. It is obvious that the planter attachment may be connected to the tractor in the reverse order. It is apparent from the description of the detaching and attaching operations that a planter attachment and a cultivator attachment have been provided, which may be readily attached to and detached from a tractor in the shortest possible time.

While the construction above described exemplifies one preferred form of the invention, it will be obvious to those skilled in the art that certain modifications in the structure are possible without departing from the scope of the invention as defined in the following claims.

What is claimed as new is:

1. The combination with a tractor having a draw-bar and a power lift device, of a lister plow directly and pivotally connected to the tractor, means for converting the lister plow into a lister planter comprising means for holding the draw-bar in a rearwardly extended position, means adapted to be attached to said draw-bar for supporting seed hopper devices and having levers attached thereto, seed hopper devices and drive means therefor, seed boot devices attached to the plow, means for connecting the power lift to the plow including said levers to effect raising and lowering of the plow.

2. The combination with a tractor having a draw-bar and a power lift device, of a lister plow directly and pivotally connected to the tractor, means for converting the lister plow into a lister planter comprising means for holding the draw-bar in a rearwardly extended position, means adapted to be attached to said draw-bar for supporting seed hopper devices and having levers attached thereto, seed hopper devices and drive means therefor including a clutch, and means for disengaging the clutch upon operation of the power lift to prevent dropping of the seeds when the plow is raised, seed boot devices attached to the plow, means for connecting the power lift to the plow including said levers to effect raising and lowering of the plow.

3. The combination with a tractor having a draw-bar and a power lift device, of a lister plow directly and pivotally connected to the tractor and having a lever mounted thereon, means for converting the lister plow into a lister planter comprising means for holding the draw-bar in a rearwardly extended position, a seed hopper supporting member attached to the draw-bar, a lever carried by the supporting member, a seed hopper device and drive means therefor, a seed boot device attached to the plow, means for connecting the power lift to the plow including both mentioned levers to effect raising and lowering of the plow, and means for adjusting the first mentioned lever to regulate the planting depth.

4. In combination, a tractor including a rear axle, a power lift device, a ground working tool, a vertically swinging pivot for attaching the forward end of said tool to the tractor ahead of the rear axle, an angularly adjustable lever pivotally mounted on said tool, means for connecting the power lift device to said lever, manual means for adjusting the angular position of the lever relative to the tool to effect a regulation of the working depth of the tool, said manual means being located ahead of the rear axle, and means for adjusting the swinging pivot to maintain the correct line of draft of the tool.

5. In combination with a tractor having a power lift device, a ground working tool frame comprising a longitudinally extending draft member having a rear portion, a brace member forming a V with the rear portion of the draft member to diverge rearwardly therewith, and a tool support bar fixed near the rear ends of both said members at a location removed from the bottom of the V to provide a rigid construction of the assembled members, working tools attached to said bar, the ends of said members extending rearwardly of the fixed bar member, and means associated with said ends of said members for connecting the tool bar to the power lift device for raising and lowering the tool frame.

6. In combination with a tractor having a power lift device, a ground working tool frame comprising a longitudinally extending draft member having a rear portion, a brace member forming a V with the rear portion of the draft member to diverge rearwardly therewith, and a tool support bar secured near the rear ends of both said members at a location removed from the bottom of the V to provide a rigid construction of the assembled members, working tools attached to said bar, a rock-shaft mounted for rotation between the draft and brace members a lever fixed to the rock-shaft, means for connecting the power lift device to said lever, and means for adjusting the angular position of the rock-shaft and lever relative to the draft member to effect a regulation of the working depth of the tools.

7. In combination, a tractor having a rear axle and a power lift device, a draft bail pivotally connected to the tractor for vertical adjustment ahead of the rear axle, a direct connected ground-working implement having its forward end pivotally connected to the draft bail, an angularly adjustable lever pivotally mounted at the rear end of the implement, means for connecting the lever to the power lift device, manual means for adjusting the lever relative to the connecting means with the power lift device, said manual means being located ahead of the tractor rear axle, and means for adjusting the draft bail to maintain the correct line of draft of the implement.

8. The combination with a tractor having an operator's station and a rear axle structure, a transversely extending frame secured to the tractor to the rear of the rear axle structure, an implement frame positioned below the transversely extending frame and adapted to be adjusted vertically with respect thereto, a draft bail mounted for vertical adjustment on the tractor ahead of the rear axle structure for connecting the implement frame to the tractor, manual means for adjusting the draft bail on the tractor ahead of the rear axle structure and within reach of the operator's station, means mounted on the implement frame adapted to be adjusted in a vertical plane, and manually actuated means for adjusting said last mentioned means mounted on said implement frame ahead of said rear axle structure and within reach of the operator's station.

9. In combination, a tractor having a rear axle structure and a power lift device, a ground-working tool frame extending transversely with respect to the tractor and pivotally connected for vertical movement at a location ahead of the tractor rear axle structure, working tools on said frame, a pair of lever devices transversely spaced with respect to each other on said tool frame, means for connecting the devices with the power lift device, and separate manual means for each lever device to adjust the angular position of the same for regulating the working depth of said tools, the said respective manual means being located ahead of the rear axle structure.

JAMES L. HIPPLE.